April 6, 1954   E. DRYDYKE   2,674,235
STEAM INJECTOR FOR INTERNAL-COMBUSTION ENGINES
Filed Sept. 18, 1951   2 Sheets-Sheet 1

INVENTOR
EUGENE DRYDYKE
By
ATTORNEY

April 6, 1954 — E. DRYDYKE — 2,674,235
STEAM INJECTOR FOR INTERNAL-COMBUSTION ENGINES
Filed Sept. 18, 1951 — 2 Sheets-Sheet 2
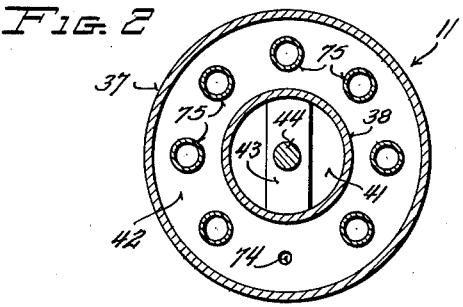
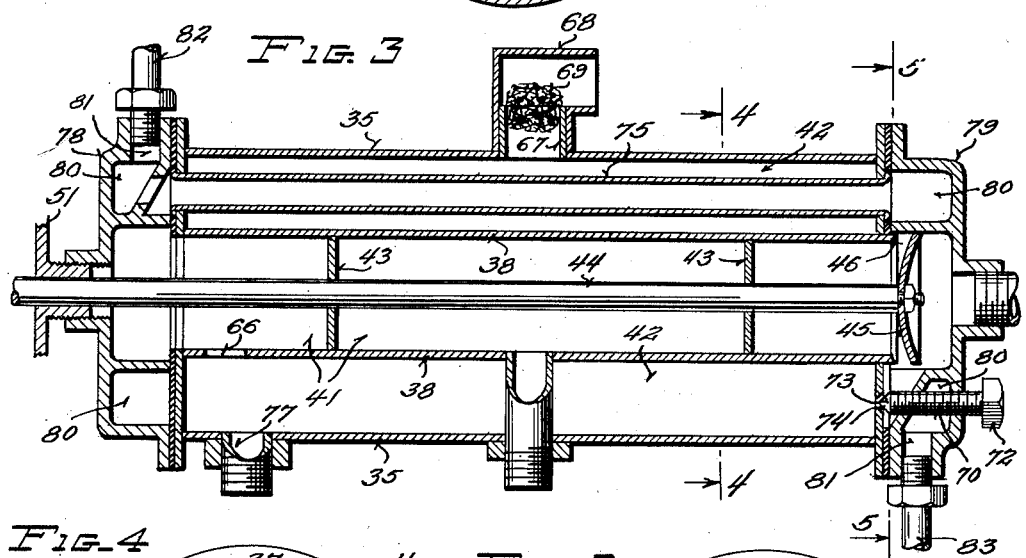
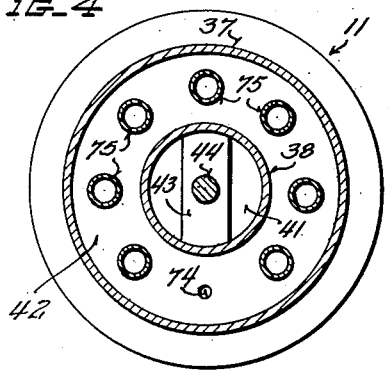
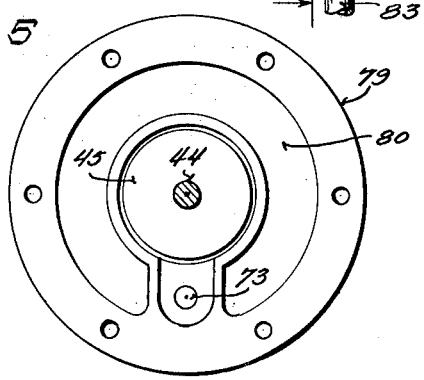
INVENTOR
EUGENE DRYDYKE
ATTORNEY Patented Apr. 6, 1954

2,674,235

UNITED STATES PATENT OFFICE 2,674,235

STEAM INJECTOR FOR INTERNAL-COMBUSTION ENGINES

Eugene Drydyke, Milwaukee, Wis.

Application September 18, 1951, Serial No. 247,126

8 Claims. (Cl. 123—25)

This invention relates to steam injectors for internal combustion engines. Since it is a well known fact that the combustion and operation of an internal combustion engine may be materially improved by the addition of small amounts of vapor or steam to the charge formed in the carburetor, there have been numerous attempts made to provide a device for regulating the amount of vapor or steam in accordance with the speed of engine operation. The addition of a regulated amount of steam or vapor, when the same is properly proportioned in accordance with varying engine speeds, serves to improve the operation of the internal combustion engine by materially reducing the formation of objectionable carbon deposits within the engine and it also imparts the highly desirable anti-knock properties usually afforded only when premium quality of fuel is employed.

While numerous devices have been produced with the view to generally improving the operation of internal combustion engines, none have proven entirely satisfactory nor have they been put into general use. The most likely reasons for the failure of these devices to meet with either practical or commercial success can be traced to two causes, the first being the excessive cost of producing the devices which have, for the most part, been extremely complicated; and secondly, the fact that many of these proposed devices have failed to provide a means by which the quantity of vapor or steam can be regulated automatically in accordance with the varying conditions resulting from changes of speed in the operation of the internal combustion engine.

The primary object of the present invention resides in the provision of a device which is simple in construction, inexpensive to manufacture and readily adapted for application to internal combustion engines in a manner to overcome the objections above noted with reference to prior attempts to provide a steam injector capable of varying the supply of vapor or steam to the fuel charge for the engine in accordance with the varying conditions dictated by changes of speed of the engine.

Another object of the present invention resides in the provision of a new and improved steam injector capable of introducing into the charge a properly proportioned quantity of water-free steam, the quantity of steam being automatically controlled by the variation of the vacuum formed in the intake manifold resulting from changes of engine speed.

Another object of the invention resides in the provision of a new and improved steam injector for internal combustion engines which includes a water reservoir, a boiler or steam generator, a steam reservoir, a float valve device for maintaining the desired amount of water in the boiler and an additional vacuum controlled valve means for controlling the flow of steam from the steam reservoir to the intake manifold of the engine in accordance with the variation in the amount of suction created in the intake manifold by changes of speed of the engine.

A further object of the invention resides in the provision in a steam injection system for internal combustion engines of means for condensing excessive quantities of steam and returning the water of condensation to the boiler where it may be revaporized.

A more specific object of the invention resides in the provision of new and improved means within the steam reservoir for effecting the condensation of excessive steam generated in the boiler.

A further specific object of the invention resides in the provision in a steam injector system of improved means for condensing excessive amounts of steam within the steam reservoir by providing a cooling system therein including a fluid circulator connected in the water cooling system of the internal combustion engine.

Other objects of the invention will become apparent from the following description of illustrative embodiments of the present invention shown in the accompanying drawing.

In the drawing:

Fig. 2 is a transverse vertical sectional view taken on the line 2—2 of Fig. 1 showing the cooling tubes in the steam reservoir and also showing one of the guides for the steam control valve;

Fig. 3 is a vertical longitudinal sectional view showing a modified form of the steam reservoir and showing the same provided with a circulating system arranged for connection into the cooling system of the internal combustion engine for effecting the condensation of steam in excess of the amount required for injection into the charge in accordance with changes of engine speed;

Fig. 4 is a transverse vertical sectional view taken on the line 4—4 of Fig. 3 showing the general arrangement of the several coolant tubes disposed between the headers forming the ends of the steam reservoir; and Fig. 5 is a vertical transverse sectional view taken on the line 5—5 of Fig. 3 showing the water jacket and idling valve arrangement in one of the header elements.

Figure 1:
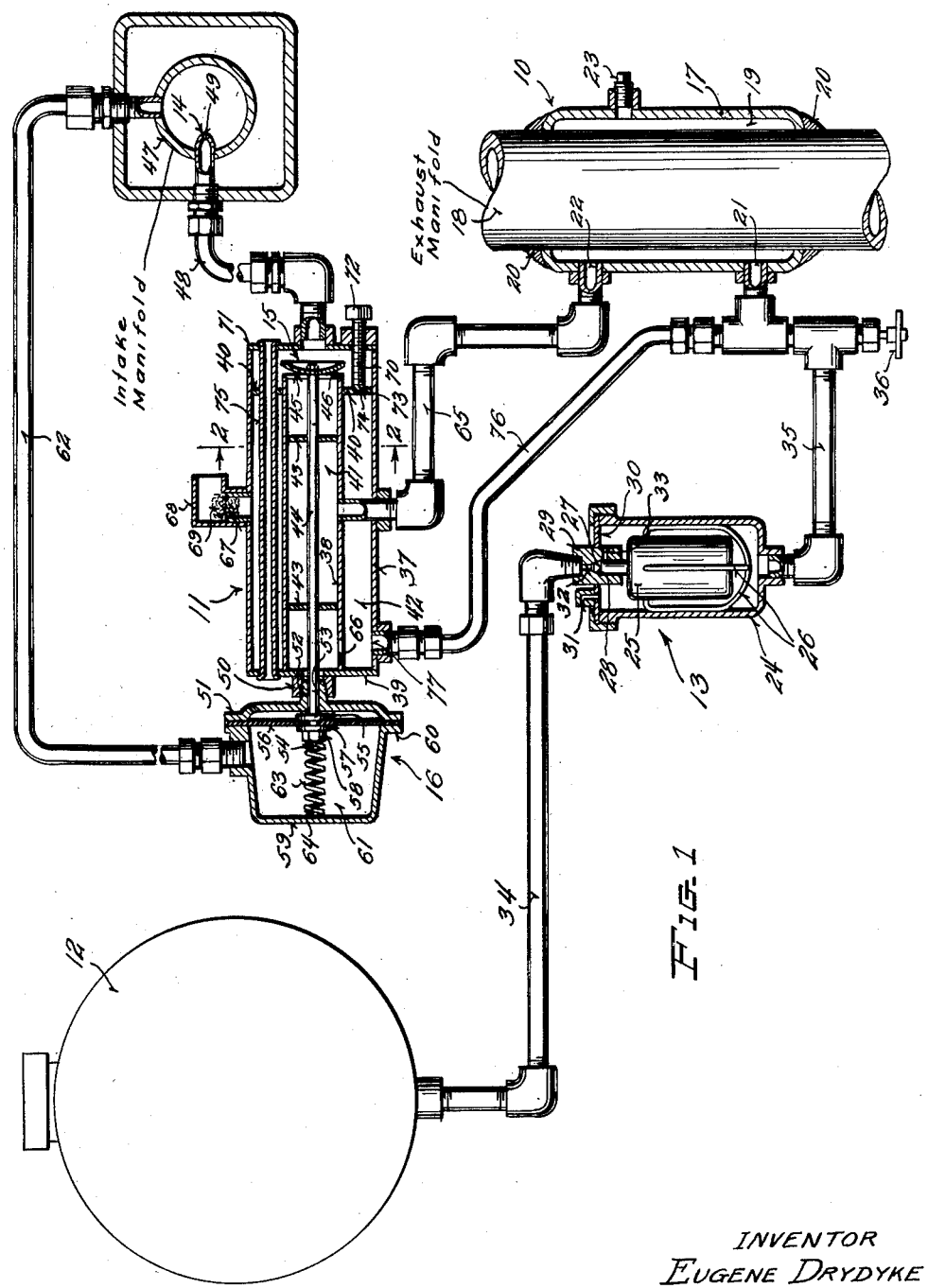
Figure 1 is a schematic diagram showing a steam injector system for internal combustion engines constructed in accordance with the teachings of the present invention.

The steam injector chosen for illustrative purposes in the accompanying drawings comprises generally a boiler 10, a steam reservoir 11, a water reservoir 12, a float controlled valve 13 for regulating the amount of water supplied to the boiler 10, a steam injection nozzle 14, positioned in the intake manifold of the engine and a steam control valve 15 positioned in the steam reservoir 11. The operation of the steam control valve 15 is regulated by a diaphragm mechanism 16 having one side of the diaphragm open to atmospheric pressure and the other side thereof connected to the intake manifold of the engine to effect movement of the control valve in accordance with variations in the vacuum in the intake manifold caused by changes in the speed of the operation of the internal combustion engine.

The water boiler 10 comprises a tubular jacket 17 adapted to encircle a portion of an exhaust pipe or manifold 18 of the internal combustion engine to form a boiler chamber 19. The tubular jacket 17 is secured in water-tight connection on the exhaust pipe 18 by welding 20 or other suitable means. The boiler 10 is further provided with intake and outlet ports 21 and 22 respectively and is also provided with a clean out plug 23.

Water is maintained at a predetermined level in the boiler 10 by the operation of the float control valve 13 which includes a casing 24 adapted to house a float 25 guided for free vertical movement within the casing 24 by bales 26 which serve to center the float 25 in the casing 24 and guide the same therein. A valve 27 carried by the float 25, cooperates with a valve seat 28 formed in a casing 29 forming a part of a cover 30 of the float control valve 13. A passage 31 formed in the cover 30 provides a means for maintaining the interior of the casing 24 at atmospheric pressure. The casing 29 also includes an inlet port 32 positioned above the valve seat 28 and an outlet port 33 positioned below the valve seat 28 to permit the flow of water from the water reservoir 12 into the float control valve 13 through suitable pipes 34 connected between the water reservoir 12 and the float control valve 13 to maintain the desired water level within the float control valve 13. Water from the float control valve 13 is directed to the intake port 21 of the boiler 10 through suitable pipe connections 35 which include a manually operable drain valve 36.

The steam reservoir 11 comprises a tubular casing 37 preferably disposed with its axis lying in a horizontal plane. An inner tubular member 38, having a substantially smaller diameter than the casing member 37, is disposed in coaxial relationship with the casing 37 and is retained in spaced relationship therewith by application at one end to an end plate 39 which forms a closure for the end of the reservoir 11. The length of the inner tubular member 38 is somewhat shorter than the tubular casing 37 and the other end of the casing is secured by solder or other suitable means to a partition 40 which serves to divide the casing 37 into a live steam receiving chamber 41 and a steam condensing chamber 42. A pair of spaced valve stem guide members 43, preferably in the form of relatively narrow plates or spiders serve to provide open communication from one end of the chamber 41 to the other are provided with aligned holes adapted to slidably receive a valve stem 44 which is axially slidable therein. One end of the valve stem 44 carries a valve 45 which is preferably circular in contour and slightly dished. The valve 45 cooperates with one end of the inner tubular member 38 provided with a valve seat 46. The movement of the valve 45 toward or from the valve seat 46 serves to regulate the size of the opening to control the flow of steam from the chamber 41 into the intake manifold 47 through piping 48 interposed between the steam reservoir 11 and the steam nozzle 14 which is provided with an orifice 49 positioned within the intake manifold 47 of the engine. The other extremity of the valve stem 44 projects through a fitting 50 located on the end plate 39 of the steam reservoir 11. The diaphragm mechanism 16 of the device comprises a base 51 having a boss 52, threadedly receivable in the fitting 50 to position and anchor the diaphragm mechanism 16 on the steam reservoir 11, and including a valve stem receiving bore 53. One extremity of the valve stem 44 is reduced in diameter and terminates in a threaded end 54 adapted to slidably receive a backing collar or washer 55, a diaphragm 56 having a central opening receivable over the threaded end 54 of the valve stem 44, a reinforcing collar 57 and a nut 58 adapted to be tightened to retain the central portion of the diaphragm firmly in position upon the valve stem 44. The marginal portion of the diaphragm 56 is adapted to lie in contact with the marginal portion of the base 51 of the diaphragm mechanism 16 and a cover 59 having marginal flange 60 is adapted to be secured to the base 51 to complete the diaphragm mechanism 16. The diaphragm mechanism included a chamber 61 which is connected by means of piping 62 to place the chamber 61 in open communication with the interior of the intake manifold 47 of the engine, so that the suction of the engine is transmitted through the piping 62 to effect the reduction of pressure against the chamber side of the diaphragm 56. A coil spring 63 housed within the chamber 61 is supported at one end on a boss 64 extending inwardly from the cover 59, with its other end is supported on the threaded end 54 of the valve stem 44. The value or strength of the coil spring 63 is relatively light and is always retained slightly compressed so as to normally retain the valve 45 away from the seat 46. The operation of the valve 45 will be hereinafter more specifically described.

Live steam generated in the boiler 10, through the heat of the exhaust manifold 18, is directed through piping 65 into the steam receiving chamber 41 of the reservoir 11. A port 66 serves to connect the steam receiving chamber 41 with the steam condensing chamber 42. The steam condensing chamber 42 is provided with a breather pipe 67 projecting upwardly from its top surface to maintain the steam reservoir at atmospheric pressure at all times. In order to prevent the infiltration of dirt or foreign matter, the breather pipe 67 is provided with a hood 68 adapted to contain a mass of filter material 69 such as steel wool, fiber glass or other similar material.

A needle valve 70 is threadedly adjustable in an end plate 71 forming a closure for the end of the steam reservoir 11 opposite plate 39. A squared end 72 formed on the outer extremity of the needle valve 70 permits manual adjustment of the same and a valve 73 formed on its inner extremity cooperates with a valve seat 74 formed in the partition 40 of the steam reservoir 11. The needle valve 70 being manually adjustable to establish a uniform minimum flow of steam from the steam reservoir 11 to the intake manifold 47 at all times. The needle valve adjustment may be considered as the idling adjustment to insure the admission of a sufficient amount of steam to the intake manifold of the engine to permit proper engine operation at idling speed.

A brief description of the operation of the steam injector will serve to emphasize its simplicity together with its effective and automatic operation to provide the proper amount of steam to insure efficient operation of the engine at any selected operating speed. As the initial suction in the intake manifold at the time of starting is extremely high, the suction thus formed, operates on the diaphragm 56 of the steam control valve 15 to cause the same to move against the light compression force of the coil spring 63 to effect the closing of the valve 45 against its cooperating seat 46. Under these circumstances, the only available steam for injection into the intake manifold 47 must be drawn through the valve 73 which permits the flow of steam in accordance with the adjustment of the needle valve 70 to satisfy the vapor or steam needs of the fuel charge. As the speed of the engine is increased, the amount of the suction in the manifold 47 is materially reduced and hence the suction on the diaphragm 56 of the valve 15 is materially lessened with the result that the coil spring 63 effects the axial movement of the valve stem 44 which causes the valve 45 to move away from the valve seat 46 and permit the introduction of a larger amount of steam into the intake manifold 47 with the higher operating speed of the engine. Obviously, slightly higher speeds above an idle speed will effect a minor change in the suction in the chamber 61 and hence the valve 45 will move only a slight amount to open it for the passage of steam from the reservoir 11 into the manifold 47. As speeds are increased, the relative movement between the valve 45 and the valve seat 46 will be increased in proportion to the effectiveness in suction in the intake manifold 47 and hence in the chamber 61 of the diaphragm device 16.

It should be understood that any excess steam, over that required to satisfy the suction demand created within the intake manifold 47 of the engine, will pass through the port 66 and into the condensing chamber 42 of the steam reservoir 11. It should be noted at this time that a plurality of open ended tubes 75 are positioned in parallel spaced relationship about the circumference of the condenser chamber 42. These several tubes are inserted through openings formed respectively in the end plates 39 and 71 of the steam reservoir 11 and the tubes are retained in proper position therein by swaging their ends around the openings formed in the end plates. These open ended tubes 75 provide a plurality of passages through which air may circulate to reduce the temperature of the steam or vapor within the steam condensing chamber 42. Rapid reduction in temperature of steam within the chamber 42 is effected by reason of the relatively large surface area of the several tubes and the relatively small volume of the chamber 42. The reduction of temperature within the chamber 42 effects the condensation of the unused portion of the generated steam and the water of condensation thus formed drains back to the boiler 10 through suitable piping 76 which is interposed between a drain opening 77 formed in the bottom wall of the steam reservoir casing 37 and the intake port 21 of the boiler 10. It should also be noted at this time that the relative positioning between the steam reservoir 11 and the boiler 10 is such that the water of condensation flows by gravity to assist in maintaining the desired water level in the boiler 10 which is also controlled by the operation of the valve 13.

Referring more particularly to Fig. 3 of the accompanying drawing, it will be noted that the steam reservoir 11 is similar in most respects to the one shown in Fig. 1. The marked difference between the two forms of the invention shown in these two figures lies in the fact that the modified form shown in Fig. 3 included a pair of header members 78 and 79 which take the place of the end plates 39 and 71, respectively, in the form shown in Fig. 1. In the present instance, the header members 78 and 79 are similar and each include a water jacket 80 and a port 81. It should be noted that the header 78 at one end of the reservoir 11 is positioned with its port 81 projecting above the top of the reservoir while the header member 79 on the opposite end of the reservoir 11 is positioned so that its port 81 projects below the bottom of the reservoir 11. The header 79 is constructed in a manner to accommodate the needle valve 70 which serves to adjustably regulate the minimum flow of steam from the reservoir 11 to the intake manifold 47 of the engine. A suitable intake connection in the form of a pipe or rubber hose 82 is connected to the port 81 of the header member 78 while a similar connector in the form of a pipe or rubber hose 83 is connected to the other header member 79. The free ends of the hoses 82 and 83 (not shown) are connected in open communication with the radiator or water circulating system of the engine. In the modified form of the reservoir 11, just described, the water from the cooling system of the combustion engine serves as the medium for cooling the steam within the condenser chamber 42 of the steam reservoir 11. Water from the radiator or cooling system of the engine is directed through the hose 82 into water jacket 80 at one end of the steam reservoir 11 and thence passes through the several tubes 75 which are disposed in parallel spaced relationship within the steam condensing chamber 42 of the steam reservoir 11 to the other water jacket 80 at the opposite end of the reservoir from which it is discharged through the hose 83 back into the cooling system of the engine. Since the normal operating temperature of the water in the cooling system of the engine normally runs between 150 and 160 degrees Fahrenheit, it is obvious that this temperature will effect the condensation of the unused portion of steam which lies within the condenser chamber 42 of the reservoir 11.

From the foregoing detailed description of the present invention, it will readily be seen that a new and improved steam injector for internal combustion engines has been provided which is simple in form, inexpensive to manufacture and readily adapted for application to existing engines. It will further be noted, that the steam injector provides a simple and effective method of accurately controlling the admission of steam to the fuel charge in the intake manifold of the engine in accordance with the speed of the engine which controls the amount of suction in the intake manifold and hence provides the control for the opening and closing of the steam control valve 15 through its effectiveness upon the diaphragm 56.

While the invention has been described in considerable detail in the foregoing specification, it is to be understood that various changes may be made in its embodiments without departing from or sacrificing any of the advantages hereinafter claimed.

I claim:

1. A steam injector for use in conjunction with an internal combustion engine, said injector comprising the combination of a steam reservoir, a boiler operatively associated with the exhaust means of the engine and connected to said reservoir to supply the same with live steam, connecting means associated with said reservoir and the intake manifold of the engine to deliver steam from said reservoir to the intake manifold of the engine, a valve for controlling the release of steam from said reservoir to said connecting means, a diaphragm device responsive to the suction in the intake manifold of the engine for controlling the position of said valve to regulate the flow of steam from said reservoir in accordance with variations of suction in the intake manifold dictated by changes of engine speed, and a manually operable valve adjustable to regulate the admission of steam from said reservoir to said connecting means when the engine is idling.

2. A steam injector for use in conjunction with an internal combustion engine, said injector comprising a steam reservoir including a live steam chamber and a condensing chamber, a boiler operatively associated with the exhaust means of the engine and connected to the live steam chamber of said reservoir to supply the same with steam, connecting means associated with said reservoir and the intake manifold of the engine to deliver steam from said reservoir to the intake manifold, a valve means responsive to variations in the amount of suction in the intake manifold for regulating the flow of steam from said reservoir in accordance with variations in the suction in the intake manifold as dictated by changes of engine speed, and a manually operable valve adjustable to regulate the admission of steam from said reservoir to said connecting means when the engine is idling.

3. A steam injector for use in conjunction with an internal combustion engine, said injector comprising a steam reservoir including a live steam chamber and a condensing chamber, a boiler operatively associated with the exhaust means of the engine and connected to said reservoir to supply the same with steam, connecting means associated with said reservoir and the intake manifold of the engine to deliver steam from said reservoir to the intake manifold, a valve for controlling the release of steam from said reservoir to said connecting means, control means responsive to variations in the suction in the intake manifold of the engine for controlling the position of said valve to regulate the flow of steam from said reservoir to said connecting means, and a plurality of heat transfer tubes disposed within said condensing chamber to dissipate the heat of the steam to effect the condensation of steam in excess of the amount directed to the intake manifold of the engine.

4. A steam injector for use in conjunction with an internal combustion engine, said injector comprising a steam reservoir including a live steam chamber and a condensing chamber, a boiler operatively associated with the exhaust means of the engine and connected to said reservoir to supply the same with steam, connecting means associated with said reservoir and the intake manifold of the engine to deliver steam from said reservoir to the intake manifold, a valve for controlling the release of steam from said reservoir to said connecting means, control means responsive to variations in the suction in the intake manifold of the engine for controlling the position of said valve to regulate the flow of steam from said reservoir to said connecting means, a plurality of heat transfer tubes disposed within said condensing chamber to dissipate the heat of the steam to effect the condensation of steam in excess of the amount directed to the intake manifold of the engine, and a manually operable valve adjustable to regulate the admission of steam from said reservoir to said connecting means when the engine is idling.

5. A steam injector for use in conjunction with an internal combustion engine, said injector comprising a steam reservoir having a centrally arranged live steam chamber, and a surrounding condensing chamber, a boiler operatively associated with the exhaust means of the engine and connected to the live steam chamber of said reservoir to supply the same with steam, connecting means associated with said reservoir and the intake manifold of the engine to deliver steam from said live steam chamber to the intake manifold, valve means movable in response to variations in the amount of suction in the intake manifold for regulating the flow of steam from said reservoir to the intake manifold, and a plurality of heat transfer tubes disposed within said condensing chamber for dissipating the heat of the steam to effect the condensation of steam in excess of the amount directed to the intake manifold of the engine.

6. A steam injector for use in conjunction with an internal combustion engine, said injector comprising a steam reservoir having a centrally arranged live steam chamber, and a surrounding condensing chamber, a boiler operatively associated with the exhaust means of the engine and connected to the live steam chamber of said reservoir to supply the same with steam, connecting means associated with said reservoir and the intake manifold of the engine to deliver steam from said live steam chamber to the intake manifold, valve means movable in response to variations in the amount of suction in the intake manifold for regulating the flow of steam from said reservoir to intake manifold, a plurality of heat transfer tubes disposed within said condensing chamber for dissipating the heat of the steam to effect the condensation of steam in excess of the amount directed to the intake manifold of the engine, and a manually operable valve adjustable to regulate the admission of steam from said reservoir to said connecting means when the engine is idling.

7. A steam injector for use in conjunction with an internal combustion engine, said injector comprising a steam reservoir including a centrally arranged live steam chamber, a condenser chamber surrounding said live steam chamber, a pair of coolant containing header elements forming closures for said reservoir and a plurality of coolant carrying heat transfer tubes disposed within said condensing chamber and connecting said header elements, a boiler operatively associated with the exhaust means of the engine and connected to the live steam chamber of said reservoir to supply the same with steam, connecting means associated with said reservoir and the intake manifold of the engine to deliver steam from said reservoir to the intake manifold of the engine, and valve means movable in response to variations in the amount of suction in the intake manifold for regulating the flow of steam from said reservoir to the intake manifold, said coolant containing header elements and said coolant carrying tubes being effective to dissipate the heat of the steam to condense that in excess of the amount directed to the intake manifold of the engine.

8. A steam injector for use in conjunction with an internal combustion engine, said injector comprising a steam reservoir including a centrally arranged live steam chamber, a condenser chamber surrounding said live steam chamber, a pair of coolant containing header elements forming closures for said reservoir, and a plurality of coolant carrying heat transfer tubes disposed within said condensing chamber and connecting said header elements, a boiler operatively associated with the exhaust means of the engine and connected to the live steam chamber of said reservoir to supply the same with steam, connecting means associated with said reservoir and the intake manifold of the engine to deliver steam from said reservoir to the intake manifold of the engine, valve means movable in response to variations in the amount of suction in the intake manifold for regulating the flow of steam from said reservoir to the intake manifold, said coolant containing header elements and said coolant carrying tubes being effective to dissipate the heat of the steam to condense that in excess of the amount directed to the intake manifold of the engine, and a manually operable valve adjustable to regulate the admission of steam from said reservoir to said connecting means when the engine is idling.

References Cited in the file of this patent

UNITED STATES PATENTS

| Number | Name | Date |
|---|---|---|
| 1,497,533 | Barron | June 10, 1924 |
| 1,527,773 | Bell et al. | Feb. 24, 1925 |
| 1,554,539 | Weinhouse | Sept. 22, 1925 |
| 1,578,216 | Stutika | Mar. 23, 1926 |
| 1,889,584 | Zimmerer | Nov. 29, 1932 |